Dec. 12, 1967  D. W. T. RICHARDS  3,357,515
FLEXIBLE UNDERPORTIONS FOR GROUND EFFECT VEHICLES
Filed Aug. 1, 1963  3 Sheets-Sheet 1

INVENTOR
DAVID W. T. RICHARDS

BY Larson and Taylor

ATTORNEYS

Dec. 12, 1967    D. W. T. RICHARDS    3,357,515
FLEXIBLE UNDERPORTIONS FOR GROUND EFFECT VEHICLES
Filed Aug. 1, 1963    3 Sheets-Sheet 2

INVENTOR
DAVID W. T. RICHARDS
BY Larson and Taylor
ATTORNEYS

United States Patent Office 3,357,515
Patented Dec. 12, 1967

3,357,515
FLEXIBLE UNDERPORTIONS FOR GROUND EFFECT VEHICLES
David William Thomas Richards, Yeovil, England, assignor to Westland Aircraft Limited, Yeovil, England
Filed Aug. 1, 1963, Ser. No. 299,298
4 Claims. (Cl. 180—128)

This invention relates to ground effect vehicles provided with flexible barriers to retard the outward flow of air from an air cushion. The barriers are capable of deflection and separation at any point along their length when meeting with an obstacle. The flexible barrier is capable of deflection and is able to return to its original position when clear of the obstacle.

Methods have been evolved to increase the clearance height of the base structure of a ground effect vehicle. One method includes the attachment of a flexible sheet to the underside of the vehicle to form a skirt. A method as described in British patent specification 929,671 provides open ended tubes or trunks which extend the peripheral jet below the base structure of the vehicle. It has been found that flexible skirts or trunking may be subjected to a relatively high ring tension when the skirt or trunking at the rear of the vehicle contacts a wave or an obstacle when the vehicle is travelling at speed. When inwardly inclined skirts or trunks are embodied a scooping action can take place at the rear of the vehicle, resulting in the trapping of a large quantity of water or debris.

The scooping action creates a high pressure against the trunks or skirts, which may result in the bursting of the trunks or skirts.

A further problem of drag arises when a ground effect vehicle is under way in water.

It is with the above problems in mind that the present invention has been evolved.

One object of the present invention is to provide a flexible barrier which may be deflected and parted by an obstacle, when the vehicle is in translational movement.

It is another object of the present invention to provide an improved construction of barrier formed from inflated tubes closed at the lower ends, thereby eliminating base ties or diaphragms previously attached to trunks or skirts.

It is another object of the present invention to reduce the weight of a ground effect vehicle by providing a flexible barrier of thin gauge flexible material.

It is a further object of the present invention to provide a flexible barrier against the escape of cushion air, as an extension to the underside of a ground effect vehicle wherein the flexibility of the barrier may be varied during operation of the vehicle according to requirements.

Referring to the drawings.

Figure 3:
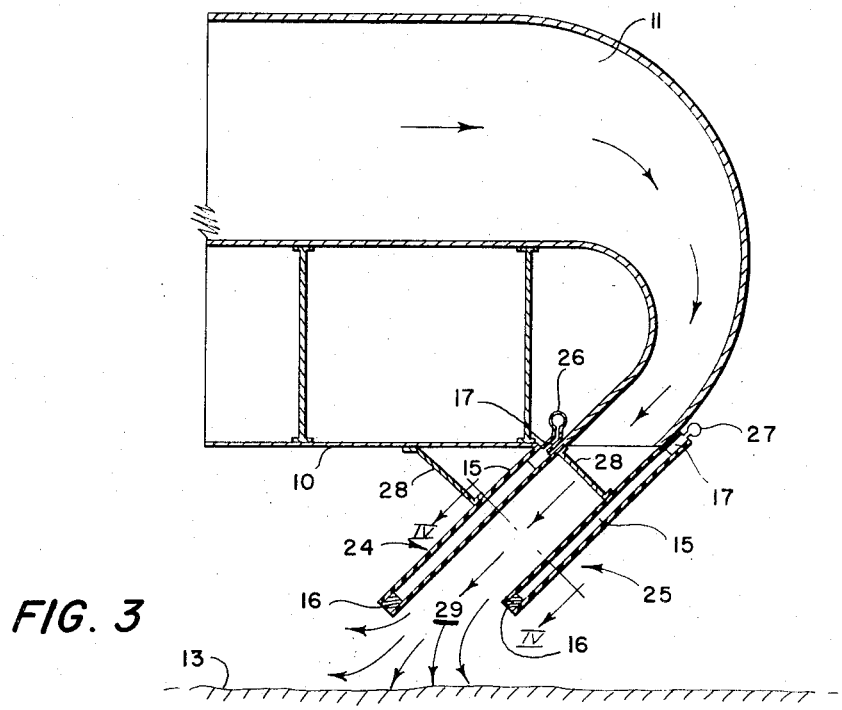

FIGURE 3 is a part vertical cross section through a ground effect vehicle in accordance with the invention incorporating a peripheral jet system, in which inner and outer flexible barriers to retard the escape of cushion air are formed from inflatable tubes closed at their lower ends and arranged in juxtaposition to form an annular duct through which air is passed to form and contain the air cushion.

Figure 4:
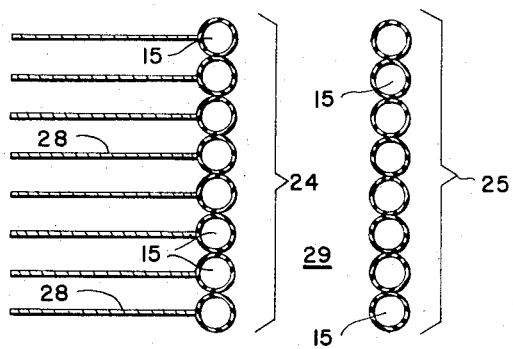

FIGURE 4 is a part sectional view taken on line IV—IV of FIGURE 3, showing the positions of the flexible barriers and the ties extending from the inner flexible barrier to the base of the vehicle.

Figure 5:
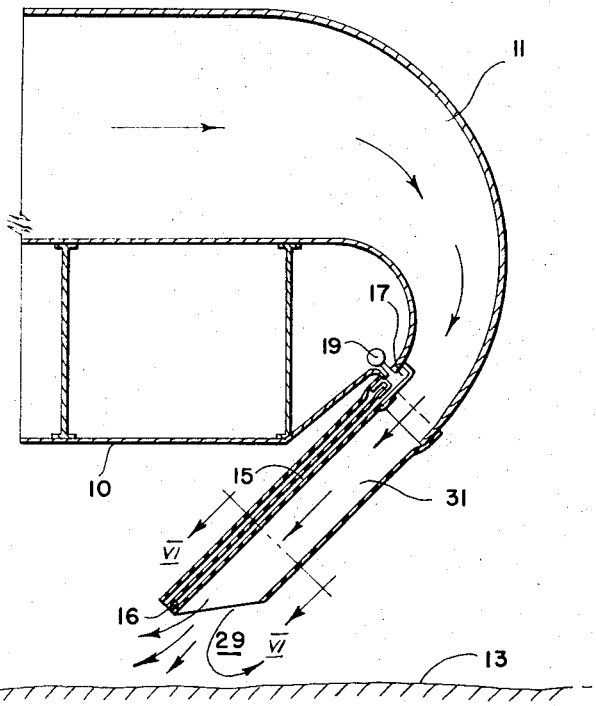

FIGURE 5 is a part vertical section through a ground effect vehicle employing a trunk system to extend the peripheral jets, in this embodiment each trunk is individually maintained in its correct operation position by an inflated tube closed at its lower end.

Figure 6:
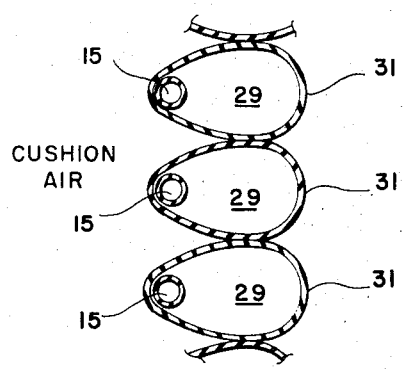

FIGURE 6 is a sectional view taken on line VI—VI of FIGURE 5 showing the incorporation of inflatable tubes in the trunks forming the air duct system, where the flexible air duct system also forms the barrier to resist the escape of cushion air from the vehicle.

Figure 1:
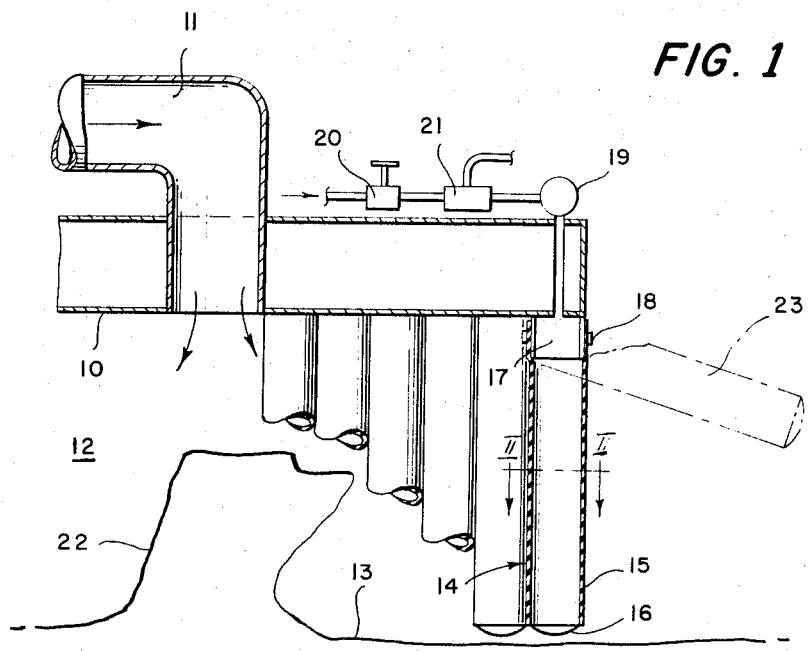
FIGURE 1 shows a vertical cross section through one side of a plenum chamber type ground effect vehicle provided with a flexible barrier to retard the escape of cushion air, a deflected tube being shown in chain dot lines.

Referring to FIGURE 1, a ground effect vehicle has a rigid base platform 10, through which an air supply 11 is directed to a plenum chamber 12 formed beneath the vehicle. The plenum chamber 12 is bounded by the ground 13 and the flexible barrier 14.

The flexible barrier 14 is formed by inflated tubes closed at their lower ends and arranged in juxtaposition. Each inflated tube 15 is closed at its lower end 16, the upper end of the tube 15 passes over a rigid sleeve 17 and is secured by an adjustable band 18. The rigid sleeve 17 is secured to the platform 10 and is supplied with high pressure air through a ring main 19 interconnecting all the sleeves 17, to inflate the tubes 15. The ring main 19 is supplied with air from a suitable high pressure source (not shown) by way of a variable pressure reducer 20 and a combined pressure relief and exhaust valve 21. The pressure at which the relief valve works may also be varied.

An obstacle in the form of a tree stump 22 is shown in FIGURE 1 and the position to which a tube 15 would be deflected by this obstacle is also shown.

Figure 2:
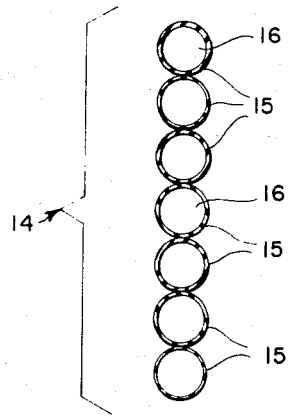
FIGURE 2 is a section taken on line II—II of FIGURE 1 showing a portion of the flexible barrier with inflated tubes closed at their lower ends and arranged in juxtaposition.

FIGURE 2 shows seven tubes 15 in juxtaposition, constituting part of the flexible barrier 14, but it is to be understood that any suitable number of tubes 15 may be used to form a surrounding barrier or part of a barrier for resisting the escape of air from the cushion of a ground effect vehicle.

Referring to FIGURE 3, which shows an embodiment of the invention claimed in this application, similar numerals have been used for similar parts. In this embodiment an inner flexible barrier 24 is formed by inflated tubes 15 fed with high pressure air through an inner ring main 26. The outer flexible barrier 25 is similarly formed by inflated tubes 15 and is supplied with high pressure air through an outer ring main 27. The attachment of inflated tubes 15 is as already described with reference to FIGURE 1. In FIGURE 3 each inflated tube 15 is attached at approximately its mid length position by a tie wire 28 to the base platform 10. Tie wires 28 are optional and the requirement for them depends on the diameter to length ratio of the tubes 15. If the diameter of the tubes 15 is small compared with their length the extra support of tie wires 28 will be required. The annular jet orifice 29 and the part of the duct system below the base platform of the vehicle is directed and bounded by the inner and outer flexible barriers 24 and 25.

FIGURE 4 shows the tie wires 28 of the inner flexible barrier 24 and the inflated tubes 15 of both inner and outer barriers.

FIGURE 5 shows a ground effect vehicle of the peripheral annular jet type embodying trunks to extend the ducts below the rigid structure of the vehicle.

Open ended trunks 31 convey air from the source of supply 11 to form and maintain the air cushion. An inflated tube 15 is arranged to abut the wall of each trunk 31 as it passes down through the inside of the trunk. The inflated tubes 15 are attached to sleeves 17 as in previous embodiments. The trunks 31 are attached to the base platform in a similar manner to the attachment of inflated tubes 15 to sleeves 17. Alternatively inflated tubes 15 may be exterior of and attached to the trunks 31. FIGURE 6 shows trunks 31 in plan form when the vehicle is operating, the inflated tubes 15 are circular in cross section but trunks 31 are deformed by the cushion pressure. The seal between adjacent trunks 31 is maintained by the pressure of the air flow downwards through the trunks. Alternatively some form of stiffening may be incorporated in the trunks 31 at their lower ends to maintain the trunks in the desired operational shape and to assist the air pressure in providing a satisfactory seal between adjacent trunks.

The seal between the tubes 15 in FIGURES 1 to 4 may be chosen to suit a particular case by selecting the pitch spacing of the tubes 15, such that they are slightly oval in cross section and the pressure in the tubes 15 when inflated exerts a sideways force giving a positive seal. Alternatively, the pitch of the tubes may be such that a slight gap, which would not allow undue escape of cushion air, is left between adjacent tubes. The choice of the pitch depends upon the particular case, and a compromise is made between freedom of movement of a tube 15 and the leakage through the flexible barrier.

In the embodiment shown in FIGURES 5 and 6 the seal between the trunks 31 is maintained partly by the pressure of the air supply 11 and partly by the stiffening of the trunks 31.

In operation the three embodiments function in a similar manner. When an obstacle such as the tree stump 22 of FIGURE 1 is encountered by the flexible barrier the high pressure inflated tubes 15 will deflect to permit the vehicle to pass over the obstacle. When the obstacle has been cleared by the inflated tube or tubes they will return to their normal operational position due to the restoring force provided by the high pressure air in them. Each tube 15 acts as a cantilever beam supported by air pressure from its sleeve 17, is generally smooth and has no projecting straps, hooks or ties at the lower end; therefore, the chance of damage due to snagging or catching up with an obstacle is relatively small.

Preferably the tubes 15 are of a woven seamless form, and are impregnated or lined with suitable rubber or plastic to render them impervious to air leakage.

The material of the tubes 15 is stretch resistant under pressure and as the bending rigidity of the material is not required to provide rigidity of the flexible barrier, the tubes are of relatively thin and light construction. This construction reduces the total weight of the flexible barrier and, therefore, a ground effect vehicle employing flexible barriers of this type will be able to carry a larger payload than a similar vehicle with a heavier skirt.

The damage due to the folding and crumbling of a flexible barrier or skirt when a ground effect vehicle is at rest on a hard surface is greatly reduced as the thickness of the material is reduced, and when a ground effect vehicle is under way in water operating as a boat, the drag of a skirt is eliminated by opening valve 21 to deflate the tubes 15.

The pressure in the tubes 15 can be varied between the maximum safety pressure of the tubes and zero by adjusting the variable pressure reducer 20 and the relief valve 21. The rigidity of the flexible barrier may be selected to suit the varying conditions in which the vehicle is used. The relief valve of valve 21 prevents excessive pressure build up when the flexible barrier strikes an obstacle or alternatively when the craft is settled on a hard surface by dissipating the cushion. It is convenient to have a relief valve of the type having its opening pressure varied to be slightly above the supply pressure.

The lower end of the inflated tubes 15 are closed by any suitable means and extra protection at the lower end of the tube 15 may be provided to resist abrasion. Any one of the tubes or trunks may be easily replaced without disturbing the other tubes or trunks.

The tubes 15 can be tapered or curved to suit particular configurations and several tubes may be joined together to form one tube assembly.

Moreover, it will be apparent that a plurality of tubes 15 could be disposed in staggered relationship around the periphery of the vehicle to present a barrier to the escape of cushion air which would also be capable of being deflected when passing over obstacles.

Although the invention has been described with reference to the periphery of a ground effect vehicle it is to be understood that the invention is not limited to the periphery as the flexible barrier may be used to divide the cushion of air beneath the vehicle into a number of compartments.

The flexible barrier formed by the tubes 15 may be used to form the front or rear barrier on a ground effect vehicle of the side wall type or in addition or alternatively the flexible barrier may partly or wholly form the side wall itself.

What is claimed as new is:

1. A ground effect machine comprising a platform-like base structure, flexible means attached to and depending downwardly from said base structure to form a flexible barrier to retard the escape of air from the underside of said base structure, said flexible means comprising at least in part a plurality of separable juxtaposed flexible tube-like members, at least some of said tube-like members being closed at their lower ends and inflated, and means for creating and maintaining a supporting cushion of pressurized fluid under said base structure, wherein said tube-like members are all closed at their lower ends and inflated, and arranged to form two spaced inner and outer flexible barriers, the space between said inner and outer barriers forming the duct of a peripheral annular jet system, and wherein said means for creating and maintaining said supporting cushion comprises means for passing pressurized air to the upper end of the space between said inner and outer barriers, whereby said pressurized air will issue from the opening defined at the lower edges of said tube-like members in the form of a fluid curtain.

2. A ground effect machine as set forth in claim 1 further comprising a plurality of flexible tie members extending between the underside of said base structure and the tube-like members which form said inner barrier, said ties being connected to the tube-like members of said inner barrier within the upper two-thirds of the lengths of the tube-like members.

3. A ground effect machine comprising a platform-like base structure, means forming an elongated duct opening downwardly from said base structure, means forming flexible barriers depending downwardly from the opposite sides of said elongated duct to retard the escape of air from the underside of the base structure, said means comprising at least in part a plurality of individually separable juxtaposed inflated flexible tubes connected to said base structure substantially along the edges of said elongated duct to form a downwardly extending flexible continuation of said duct, said tubes being closed at their lower ends, means for inflating the individual tubes, and means for passing pressurized air to said elongated duct and down through the continuation defined by said flexible tubes to issue from the elongated opening defined by the lower ends of said flexible tubes, said pressurized air issuing in the form of a fluid curtain to assist in creating and maintaining a pressurized fluid supporting cushion under said base structure.

4. A ground effect machine as recited in claim 3 wherein said elongated duct extends substantially around the periphery of the underside of said base structure.

(References on following page)

References Cited

UNITED STATES PATENTS

| | | | |
|---|---|---|---|
| 2,758,804 | 8/1956 | Hakomaki | 244—31 |
| 3,116,037 | 12/1963 | Yost | 244—31 |
| 3,279,555 | 10/1966 | Hopkins | 180—7 |

FOREIGN PATENTS

| | | |
|---|---|---|
| 1,238,499 | 7/1960 | France. |
| 929,671 | 6/1963 | Great Britain. |

OTHER REFERENCES

Design News; May 23, 1960; pages 6 and 7; "Ground Cushion Vehicle Balances With Single Engine."

A. HARRY LEVY, *Primary Examiner.*

LEO FRIAGLIA, BENJAMIN HERSH, *Examiners.*

R. M. WOHLFARTH, M. S. SALES,
*Assistant Examiners.*